United States Patent [19]

Keigler

[11] Patent Number: 4,618,112
[45] Date of Patent: Oct. 21, 1986

[54] SPACECRAFT ANGULAR MOMENTUM STABILIZATION SYSTEM AND METHOD

[75] Inventor: John E. Keigler, Princeton, N.J.

[73] Assignee: RCA Corporation, Princeton, N.J.

[21] Appl. No.: 485,294

[22] Filed: Apr. 15, 1983

[51] Int. Cl.[4] ............................ B64G 1/10; B64G 1/28
[52] U.S. Cl. ................................. 244/158 R; 244/165
[58] Field of Search ................... 244/158 R, 159, 160, 244/161, 164, 165, 170

[56] References Cited

U.S. PATENT DOCUMENTS

| 3,471,105 | 10/1969 | Yarber et al. | 244/165 |
| 3,511,452 | 5/1970 | Smith et al. | 244/165 |
| 3,695,554 | 10/1972 | Phillips | 244/170 |
| 3,767,139 | 10/1973 | Fischell | 244/165 |
| 3,999,729 | 12/1976 | Muhlfelder et al. | 244/165 |
| 4,288,051 | 9/1981 | Goschel | 244/165 |
| 4,355,775 | 10/1982 | Ganssle | 244/158 R |

OTHER PUBLICATIONS

"Boeing IUS" Brochure from AIAA Technical Display and Conference, 2-11-79 Washington, D.C.
Dougherty, "Analysis and Design of Wheel on an Attitude Control Concept" AIAA 2n Com. Sat. Sys. Conf., No. 68-461 1968.
Kaplan et al, "Attitude Acquisition Maneuver Bias Momentum Satellites", Comsat. Tech. Review, vol. 6, No. 1, pp. 1-23, 1976.

Primary Examiner—Galen L. Barefoot
Attorney, Agent, or Firm—Joseph S. Tripoli; Robert L. Troike

[57] ABSTRACT

An improved system and method of ejecting a spacecraft from a shuttle or orbiter type craft in space includes a momentum wheel on the spacecraft that has a spin axis parallel to the ejection direction, spinning-up this momentum wheel prior to ejection and after ejection de-spinning this wheel whereby the whole spacecraft spins without the need of a spin table on the shuttle or orbiter craft.

8 Claims, 11 Drawing Figures

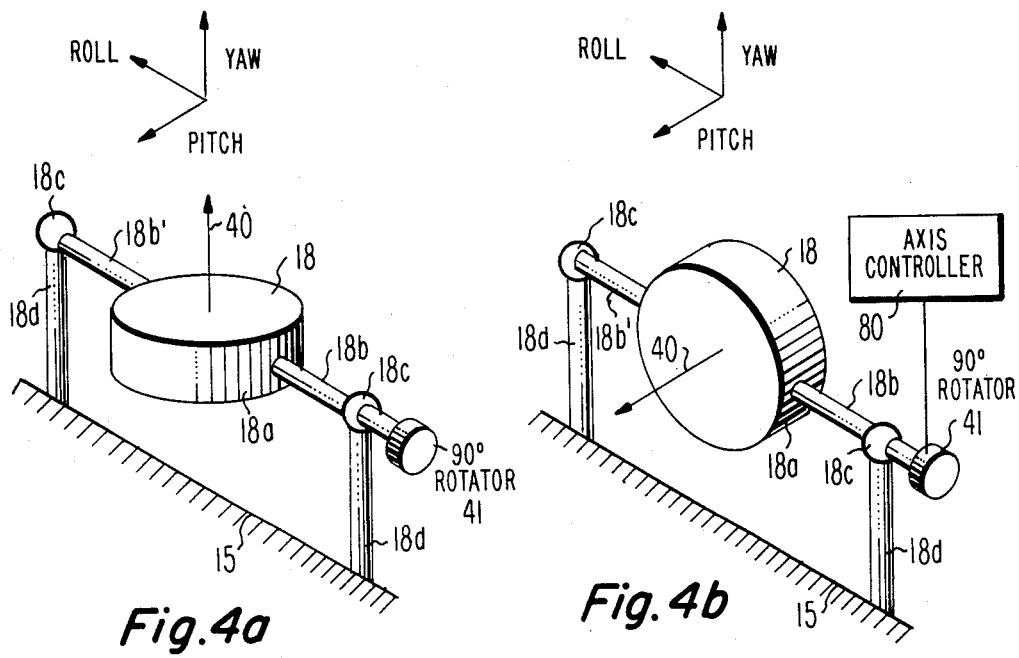
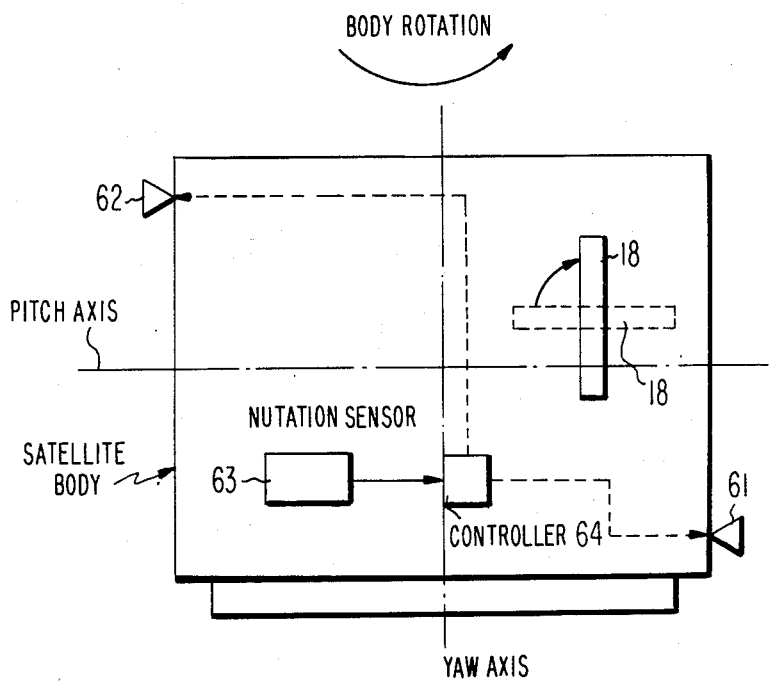

SPACECRAFT ANGULAR MOMENTUM STABILIZATION SYSTEM AND METHOD

This invention relates to a system and method for ejection and separation of spacecraft from a launch vehicle such as the U.S. Space Transportation System, more commonly referred to as the Space Shuttle or Orbiter.

The advent of the U.S. Space Transportation System (STS), introduced new requirements and conditions for the launching of unmanned spacecraft. With few exceptions, these spacecraft will be transferred from the orbit achieved by the Orbiter to a different orbit inclination and/or altitude appropriate to the particular mission of the spacecraft. Several methods of ejection and separation of the spacecraft from the Orbiter have been described, depending on the size, weight, configuration, and mission of the spacecraft. Small spacecraft with limited requirements for orientation will simply be spring ejected with sufficient separation velocity to avoid collision or contact with any part of the Orbiter. Somewhat larger spacecraft will employ the Spin Stabilized Upper Stage-Delta module (SSUS-D) which contains an electrically driven spin table to impart an attitude reference and inertial stability to the spacecraft/perigee motor assembly prior to and during separation. Still larger spacecraft will use the Spin Stabilized Upper Stage-Atlas (SSUS-A). A "frisbee-style" separation of large cylindrical spinning spacecraft is also being developed. Very large spacecraft will utilize the Inertial Upper Stage with its own fully autonomous three-axis attitude reference and control capability. In addition, the Shuttle Manipulator Arm, a long articulated boom operated by the Orbiter crew, is planned for use in removing various payloads from the Orbiter cargo bay and releasing them as "free-flying" vehicles.

Each of these deployment methods for sizeable spacecraft (together with their perigee motors) entails respective mechanisms that ensure safe operation from the Orbiter while maintaining an attitude reference supplied initially by the Orbiter. For both the SSUS-D and SSUS-A classes of spacecraft, these mechanisms include a spring table as part of the support cradle. Hence the required volume envelope in the Orbiter bay is the swept volume of the rotating assembly (plus a small divergent cone to allow for deviations from the axial linear motion during separation). The present invention eliminates both the spin table mechanism and the rotary swept volume requirement by utilizing a momentum wheel within the spacecraft which also provides momentum stability to the spacecraft during subsequent transfer orbit and final operational orbit maneuvers.

SUMMARY

In accordance with one embodiment of the present invention an improved method for launching a spacecraft from the shuttle craft includes, while the spacecraft is still in the shuttle bar, spinning up a momentum wheel which has an axis parallel to the axis of ejection of the spacecraft, ejecting the spacecraft from the shuttle craft and slowing the speed of the momentum wheel to thereby cause spinning up of the main body of the spacecraft about said axis.

In the drawing:

FIG. 4a illustrates the momentum wheel in its initial position mounted to the spacecraft;

FIG. 4b illustrates the momentum wheel in its final position stage;

FIG. 6 illustrates the position of the momentum wheel axis and the direction of satellite rotation after perigee separation (launch sequence step F and);

Figure 1:
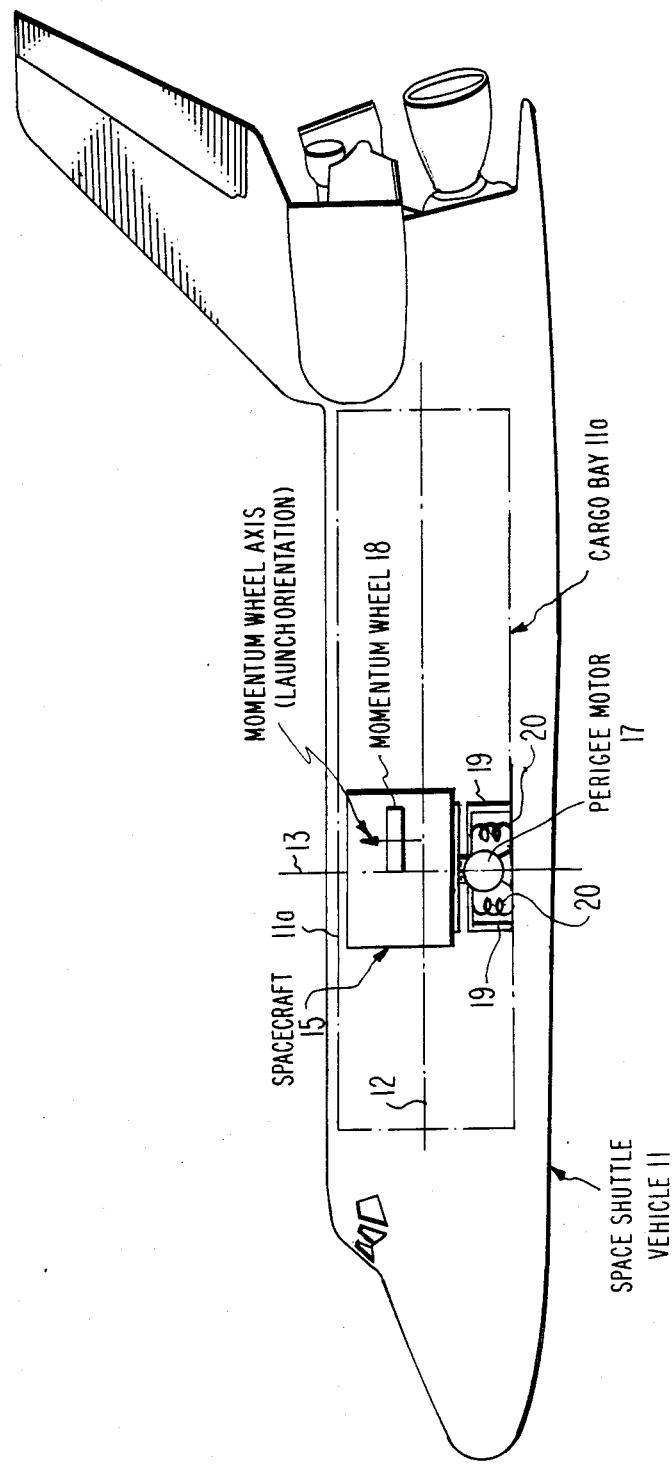
FIG. 1 illustrates the satellite and the perigee stage in the Space Shuttle.
Figure 2:
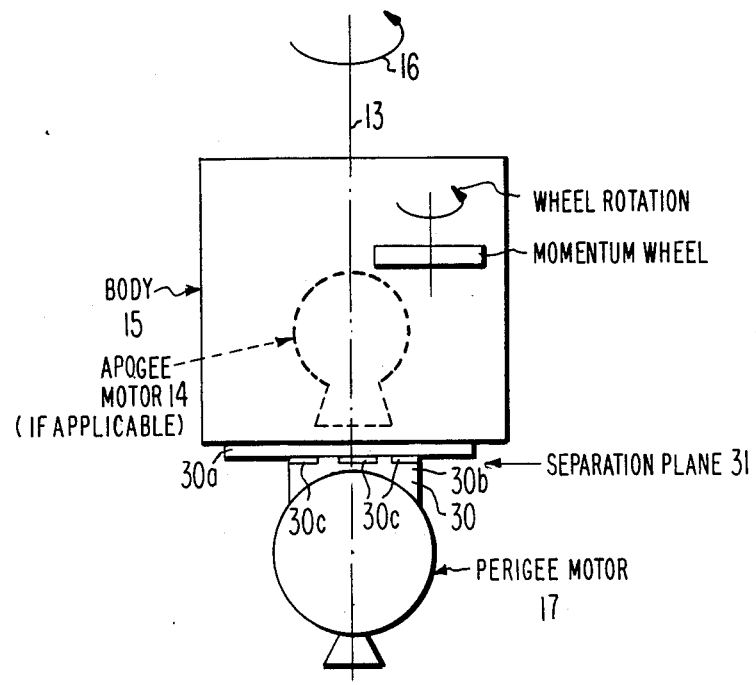
FIG. 2 illustrates the satellite and perigee stage.

Referring to FIG. 1 there is illustrated the spacecraft main body 15 and perigee motor 17 mounted in the cargo bay 11a of a Space Shuttle 11. The spacecraft main body 15 and perigee motor 17 are placed in the cargo bay 11a of the shuttle 11 before the shuttle is launched into space. The spacecraft main body 15 may include as illustrated in dashed lines in FIG. 2 an apogee motor 14 central to the main spacecraft body 15. The apogee motor 14 and the perigee motor 17 are aligned as illustrated in FIG. 2 with a primary axis 13 through the center of mass of the apogee motor and the main spacecraft body 15 and the mass center of the perigee motor 17. The spacecraft main body 15 and the perigee motor 17 are aligned such that this primary axis 13 is in the separation direction which is perpendicular to the longitudinal axis 12 of the cargo bay. The primary axis 13 is along the desired spin axis of the satellite/perigee assembly.

The perigee motor 17 is fixed to the satellite main body via a separation assembly 30. This assembly 30 rigidly attaches the satellite main body 15 to the perigee motor 17. This assembly 30 includes, for example members 30a and 30b joined to spacecraft body 15 and motor 17 respectively. Members 30a and 30b are joined by mechanical couplers 30c that are released by means such as pyrotechnic release devices for separating the perigee motor 17 from the main satellite body 15 upon remote command. This separation is along a separation plane 31 of the couplers 30c illustrated in FIG. 2.

Figure 3:
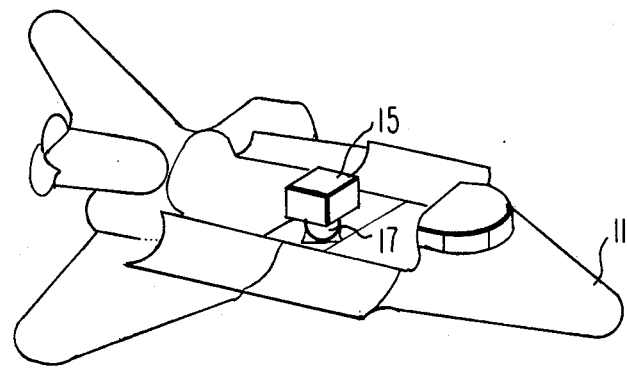
FIG. 3 illustrates the shuttle with the cargo bay doors open.

The spacecraft main body 15 and the perigee motor 17 together are so mounted in the cargo bay 11a on the cradle 19, as shown in FIG. 1, that after the cargo bay doors are opened as shown in FIG. 3, compressed spring mechanism 20 at the base of the spacecraft-perigee motor assembly is activated by command to deploy the spacecraft main body 15 and perigee motor 17 from the shuttle bay. The retainers on the cradle 19 may be released by remote controlled pyrotechnic devices. The spacecraft main body 15 includes a momentum wheel 18 which has a spin axis parallel to axis 13 and in the direction of launch of the satellite main body 15.

Referring to FIG. 4, the momentum wheel assembly 18 is illustrated with its initial spin axis 40 parallel to the yaw axis of the spacecraft main body 15 mounted in the shuttle bay 11a. The momentum wheel assembly 18 includes cylindrical housing 18a, as illustrated in FIG. 4a, with a momentum wheel placed therein which spins under the influence of a spin motor assembly located in the housing 18a. The axis of the wheel is illustrated by arrow 40. This momentum wheel assembly 18 is mounted to the spacecraft body 15 via a mount assembly with the outer momentum wheel housing 18a being coupled by shafts 18b and 18b' to rotatable joints 18c. Joints 18c are coupled to the main spacecraft body 15 via mounts 18d. The shafts 18b and 18b' and the wheel housing 18a are rotated 90° in response to a remotely controlled rotator motor 41 coupled to shaft 18b. The rotator motor 41 is actuated by electric signals via controller 80 which signal may come from a program stored in the spacecraft main body computer or which may be telemetered from the ground or the Orbiter. When actuated as illustrated in FIG. 4b, the momentum wheel assembly 18 including the momentum wheel is rotated 90° so that the axis of the wheel is parallel to the spacecraft pitch axis.

Figure 5:
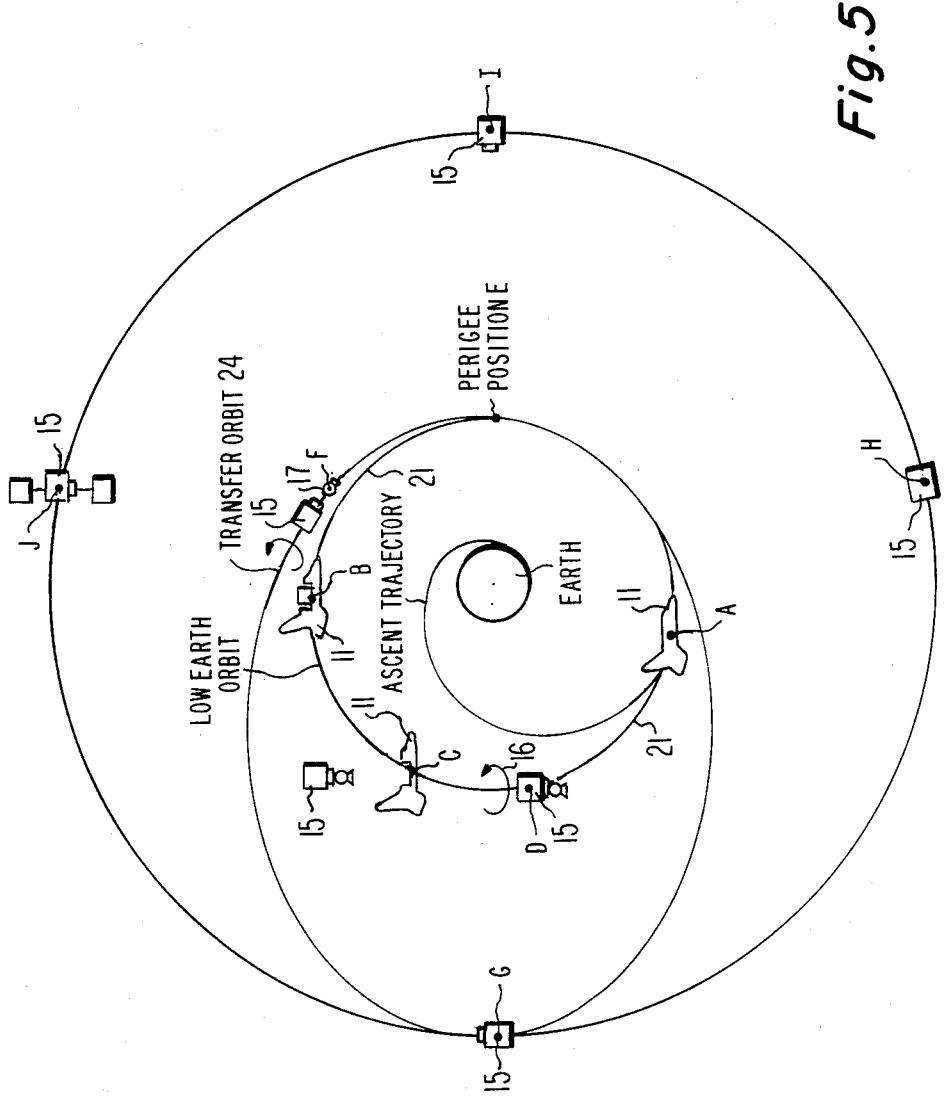
FIG. 5 is a view illustrating the launch sequence of the spacecraft from the Space Shuttle.

Referring to FIG. 5, there is illustrated the launch sequence of the spacecraft from earth to its final orbital position. The shuttle 11 with the aid of large boosters (not shown) places the shuttle in its low earth orbit 21 following the assent trajectory 22. Once in its low earth orbit 21, as shown at position A of FIG. 5, the shuttle doors are opened as shown at position B and the momentum wheel rotor in assembly 18 is spun up with its axis parallel to the satellite yaw axis. At the position marked C in FIG. 5, the spacecraft/perigee motor assembly is released by the retainer mechanism of cradle 19 in FIG. 1 and the separation springs 20 impart a linear velocity to this spacecraft/perigee assembly to eject the spacecraft/perigee motor assembly from the shuttle 11 while the inertial stability of the momentum wheel insures that this nonspinning assembly safely clears the shuttle and maintains the orientation reference for subsequent maneuvers. After adequate separation clearance between the shuttle 11 and the spacecraft/perigee motor assembly is achieved, the momentum wheel is deenergized to transfer its angular momentum to the spacecraft/perigee motor assembly. As shown at launch sequence marked D, the satellite/perigee motor assembly are rotated together as indicated by arrow 16. This body rotation increases as the wheel 18 slows down to zero momentum. This rotation is about axis 13 in FIG. 2. For many cases of practical interest, the resultant spin of the spacecraft/perigee motor assembly will then be about an axis of minimum inertia, thus requiring a nutation damper such as an active nutation damper to maintain alignment of this body axis (which is generally parallel to the thrust axis of the perigee motor) to the inertially fixed angular momentum vector. This active nutation damping can be provided via thrusters such as thrusters 61 and 62 in FIG. 6 under control of a nutation sensor 63 and controller 64. Tip-off errors due to orbiter separation can be detected either by an inertial reference unit (for example gyros) or by simple sun and earth sensors after the spacecraft's/perigee motor assembly is spun up.

At perigee position E of the desired transfer orbit 24, the perigee stage is fired to place the satellite body and perigee stage into the transfer orbit where at apogee the spacecraft is about 22,300 miles from earth. As required, additional body spin rate can then be imparted by small thrusters (not shown) to insure spin-averaging of thrust vector misalignment disturbances during perigee motor firing. At the position marked F, shortly after perigee burn, illustrated in FIG. 5, the perigee stage motor 17 is separated from the main spacecraft body 15 while both are spinning. The separation is accomplished for example, by small pyrotechnic devices which under remote control means separates the perigee motor along the separation plane 31 illustrated in FIG. 2. After separation of the expended perigee motor the spinning spacecraft body 15 may or may not be spin stable (namely spinning about an axis 13 which may or may not be the axis of maximum inertia). The active nutation damper can correspondingly be inactivated or remain operating. In either case, the original inertial orientation reference acquired from the shuttle has been maintained throughout the separation and perigee motor firing sequence. Ground controlled or autonomous maneuvers during the separation and transfer orbit phases of the mission are performed to reorient the spin axis for firing the apogee motor to achieve final orbital velocity and direction using well known techniques of suitably pulsed thrusters.

At about the 22,300 mile desired position of apogee of the transfer orbit the apogee motor in the satellite main body is fired to insert the spacecraft into the final circular geostationary orbit. This is illustrated at the position marked G in FIG. 5.

At some convenient time during the interval between transfer orbit injection and the final orbit momentum orientation, the shafts 18b and 18b' are rotated and consequently the axis of the deenergized momentum wheel assembly 18 is rotated approximately 90° from its ejection position (with spin axis 40 of wheel parallel to the thrust line of the perigee and apogee motors) to the on orbit position (with the spin axis 40 of the wheel parallel to the on orbit pitch axis) as illustrated in FIG. 4b. These shafts are rotated by rotator 41 and axis controller 80 which responds to either ground command or on-board computer command. This is also illustrated schematically in FIG. 6 where the dashed line of wheel assembly 18 illustrates the initial launch orientation of the momentum wheel and the solid line illustrates the in orbit orientation of the momentum wheel. Note that the spacecraft body rotation axis is about the yaw axis at ejection from the shuttle and in the orbit position the momentum wheel axis is perpendicular to the yaw axis, i.e., along the pitch axis.

After apogee motor burn, at the launch sequence marked H in FIG. 5, the satellite attitude is adjusted such that the spin axis which is presently the yaw axis is rotated to be perpendicular to the orbit normal. This may be accomplished for example by thrusters (see for example thrusters 61 and 62 in FIG. 6) on a spacecraft as indicated in U.S. Pat. No. 3,977,633 of Keigler et al. These thrusters are located on the spacecraft so that they thrust perpendicular to the spin axis of the spacecraft to cause the yaw axis to be precessed perpendicular to the orbit normal with the satellite spinning about this yaw axis.

Figure 7A:
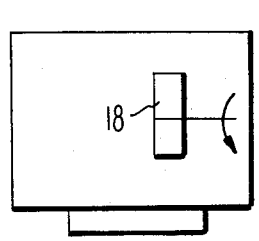
FIGS. 7a, 7b and 7c illustrate the dual spin turn (launch sequence step I)
Figure 7B:
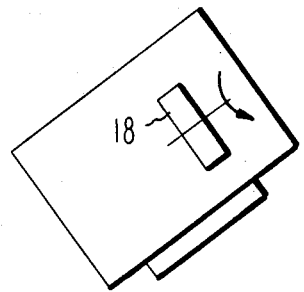
Figure 7C:
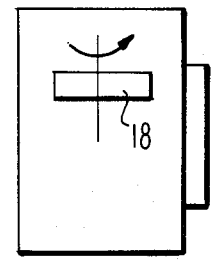

At the launch position marked I in FIG. 5, a dual spin turn, as described for example in U.S. Pat. No. 3,940,096 of Keigler et al., is performed. In this maneuver, as illustrated in more detail in FIGS. 7a, 7b and 7c, the momentum wheel which has been rotated 90° so that its axis is parallel to the pitch axis of the satellite is energized from zero rotation to increasing speeds. This causes the rotation of the spacecraft from its initial spin axis orientation to an axis parallel to the momentum wheel axis with the final convergence of the momentum wheel axis to the momentum vector being effected by dissipation in a nutation damper in the spacecraft. FIG. 7a illustrates the wheel spin up and FIG. 7b illustrates the satellite during the dual spin turn in which the body is coning. FIG. 7c illustrates the body reoriented with the momentum wheel axis and pitch axis of the satellite perpendicular to the orbit normal. The spacecraft momentum is absorbed by the wheel as the pitch axis aligns itself with the orbit normal. As the wheel approaches its final speed and the body axes rotate, nutation occurs and dampers such as liquid passive dampers or active dampers are used to decrease the motion in a reasonable time. The above dual spin turn, which is described in the Keigler et al., U.S. Pat. No. 3,940,096, is for the case where the preselected axis is the maximum moment of inertia axis. For reorienting the spacecraft where the preselected axis is other than the maximum moment of inertia axis, see U.S. Pat. No. 4,175,861 of Hubert et al. This dual spin turn is also generally described in the text of Kaplan, M. H., "Modern Spacecraft Dynamics Control", John Wiley and Sons publisher, 1976, pages 367–379.

In the position marked I in FIG. 5 the yaw axis is pointing toward earth and the pitch axis is perpendicular to the orbit normal. At the position marked J, the solar arrays are deployed and the satellite is in its final orbiting position. Active nutation damping of the spacecraft, as described in Phillip U.S. Pat. No. 3,695,554, can be accomplished using the momentum wheel 18 rotated so its axis is parallel to the pitch axis as shown in FIG. 4b.

Figure 8:
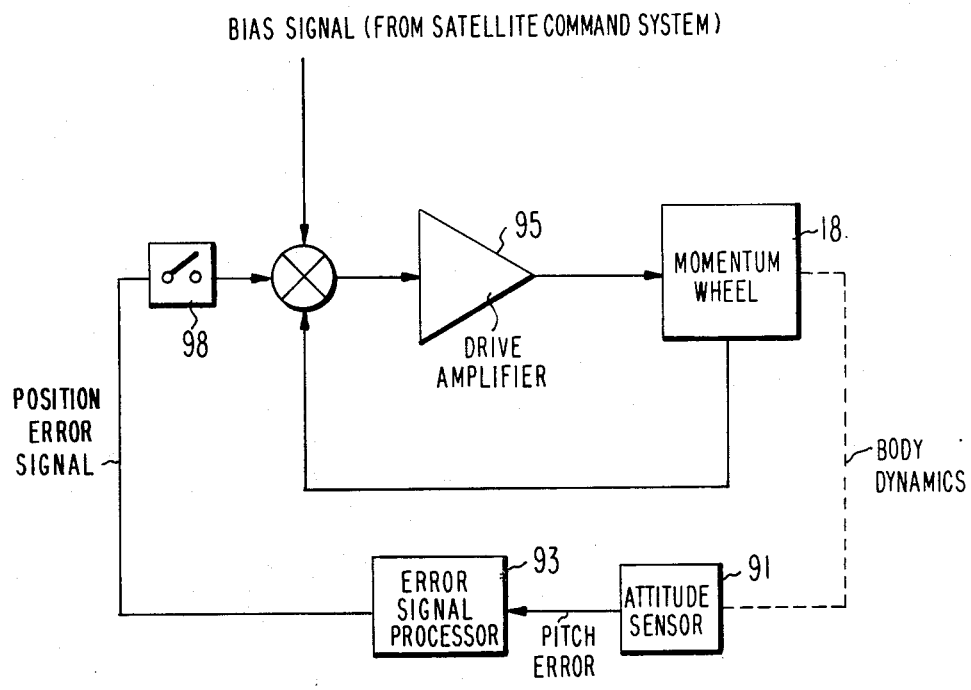
FIG. 8 is a block diagram of the wheel control system.

FIG. 8 illustrates a sketch of the momentum wheel control circuit for maintaining proper speed of the momentum wheel and the proper spacecraft body position. The wheel speed is controlled by sampling the momentum wheel speed via a tachometer and comparing that signal to a bias control signal such as a satellite command which then provides a proper signal level through drive amplifier 95 to the momentum wheel to achieve the correct momentum speed. The attitude control system senses the attitude position of the satellite by attitude sensor 91. The attitude sensor provides a pitch error signal which is then processed through an error signal processor 93 to derive a position error control signal that is then applied to momentum wheel drive amplifier 95 to control the speed of the momentum wheel. A switch 98 is closed after the dual spin turn for attaining the pitch lock.

I claim:

1. A method for placing a spacecraft in orbit from the cargo bay of the space shuttle or orbiter type craft where the satellite is mounted in an ejection direction perpendicular to the longitudinal axis of the shuttle craft and where said spacecraft and a perigee motor are fixed to each other to form a spacecraft/perigee motor assembly comprising the steps of:

providing said spacecraft from a momentum wheel that has a spin axis in the launch direction;

spinning said momentum wheel so that the momentum vector is parallel to the ejection direction of the spacecraft's/perigee motor assembly when said assembly is separated from the shuttle craft;

ejecting the non-spinning spacecraft/perigee motor assembly from said shuttle craft imparting a linear velocity to the assembly in said ejection direction while the inertial stability of the momentum wheel assures the orientation of said satellite/perigee motor assembly; and after ejecting the spacecraft/perigee motor assembly from the shuttle craft reducing the spinning of said momentum wheel to zero whereby the resultant spacecraft/perigee assembly is spun up.

2. The method of claim 1 further including the steps of:

firing said perigee motor when said spacecraft/perigee motor assembly is in the appropriate perigee location of its transfer orbit;

separating said spacecraft from said perigee motor after firing said perigee motor;

rotating the orientation of the deenergized momentum wheel approximately 90° from its ejection position;

firing the apogee motor; and spinning up said rotated momentum wheel to provide a dual spin turn of the spacecraft.

3. The method of claim 1 further including the steps of:

firing said perigee motor at the desired perigee location of the transfer orbit of said spacecraft;

separating said spacecraft from said perigee motor;

at apogee location of the transfer orbit firing the apogee motor of said spacecraft;

changing the axis of said spacecraft such that said spin axis is perpendicular to the orbit plane;

at some time between the firing of said perigee motor and said final orbit momentum orientation changing the orientation of the spin axis of said momentum wheel by 90° so that said spin axis of said momentum wheel is 90° to the spin axis of said spacecraft; and after orienting the spin axis to be perpendicular to the orbit normal, spinning up said momentum wheel to cause said spacecraft to rotate so that said momentum wheel axis is perpendicular to the orbit plane.

4. In a spacecraft of the type to be launched from the cargo bay of a space shuttle type craft where the spacecraft is fixed to the perigee motor with the yaw axis of the spacecraft aligned with the thrust axis of the perigee motor to form a spacecraft/perigee motor assembly and where said combination spacecraft/perigee motor assembly is to be ejected from the cargo bay in a direction perpendicular to the longitudinal axis of the shuttle craft, the improvement for maintaining body stability during ejection and separation from the shuttle without the necessity of spinning the entire spacecraft/perigee motor assembly comprising: a momentum wheel oriented with its spin axis parallel to the ejection direction of said satellite and said yaw axis of the spacecraft and means for spinning said momentum wheel before said spacecraft/perigee motor assembly is ejected from said shuttle craft, means for deenergizing said momentum wheel after said spacecraft/perigee motor assembly is ejected from said shuttle craft, and said momentum wheel being rotatably fixed to said spacecraft such that upon presence of a command signal said momentum wheel spin axis rotates approximately 90° to be parallel to the spacecraft pitch axis.

5. The improvement in accordance with claim 4 wherein said spacecraft further includes an active nutation damper to insure that the spacecraft, with or without the perigee motor attached, spins about the thrust axis of the perigee motor even though that axis is the minor axis instead of the major axis of inertia.

6. The improvement in accordance with claim 4 wherein said spacecraft further includes means to vary the input speed of the momentum wheel in response to pitch and/or roll error signals or ground commands to achieve two-axis body stabilized off-set and active nutation damping via said single momentum wheel.

7. In a spacecraft of the type to be launched from the cargo bay of a space shuttle type craft where the spacecraft is fixed to the perigee motor with the yaw axis of the spacecraft aligned with the thrust axis of the perigee motor to form a spacecraft/perigee motor assembly where said combination spacecraft/perigee motor assembly is to be ejected from the cargo bay in a direction perpendicular to the longitudinal axis of the shuttle craft, the improvement for maintaining body stability during ejection and separation from the shuttle without the necessity of spinning the entire spacecraft/perigee motor assembly comprising: a momentum wheel oriented with its spin axis parallel to the ejection direction of said satellite and said yaw axis of the spacecraft and means for spinning said momentum wheel before said spacecraft/perigee motor assembly is ejected from said shuttle craft, means for deenergizing said momentum wheel after said spacecraft/perigee motor assembly is ejected from said shuttle craft, and mounting means for rotatably mounting said momentum wheel to the spacecraft to provide an approximately 90° rotation of the wheel axis, and further comprising rotator means coupled to said mounting means responsive to a ground command signal and/or onboard sequencer for rotating the spin axis of the momentum wheel approximately 90°.

8. The improvement in accordance with claim 7 wherein said momentum wheel, after the 90° rotation, is energized and subsequently controlled by means responsive to ground command and/or an onboard pitch error detection system.

* * * * *